United States Patent
Naghmouchi et al.

(10) Patent No.: US 10,621,631 B2
(45) Date of Patent: Apr. 14, 2020

(54) INDIVIDUAL ONLINE PRICE ADJUSTMENTS IN REAL TIME

(71) Applicant: International Business Machines Corporation, Armonk, NY (US)

(72) Inventors: Jamin Naghmouchi, Rintein (DE); Hubertus Franke, Cortlandt Manor, NY (US)

(73) Assignee: International Business Machines Corporation, Armonk, NY (US)

(*) Notice: Subject to any disclaimer, the term of this patent is extended or adjusted under 35 U.S.C. 154(b) by 218 days.

(21) Appl. No.: 15/600,977

(22) Filed: May 22, 2017

(65) Prior Publication Data

US 2017/0255973 A1 Sep. 7, 2017

Related U.S. Application Data

(63) Continuation of application No. 13/034,180, filed on Feb. 24, 2011, now Pat. No. 9,659,317.

(51) Int. Cl.
*G06Q 30/02* (2012.01)
*G06Q 30/06* (2012.01)

(52) U.S. Cl.
CPC ..... *G06Q 30/0283* (2013.01); *G06Q 30/0206* (2013.01); *G06Q 30/0619* (2013.01); *G06Q 30/0631* (2013.01)

(58) Field of Classification Search
None
See application file for complete search history.

(56) References Cited

U.S. PATENT DOCUMENTS

| | | | | |
|---|---|---|---|---|
| 5,873,069 A | * | 2/1999 | Reuhl | G06Q 20/201 235/375 |
| 6,076,070 A | * | 6/2000 | Stack | G06Q 20/201 235/375 |

(Continued)

FOREIGN PATENT DOCUMENTS

| | | | | |
|---|---|---|---|---|
| KR | 20000063184 A | * | 11/2000 | |
| WO | WO-0127839 A1 | * | 4/2001 | G06Q 30/06 |

OTHER PUBLICATIONS

Patel et al., "Review and Future Research Directions of Secure and Trustworthy Mobile Agent-Based E-Marketplace Systems, A," [Abstract only] Information Management & Computer Security, 18.3: 144-161, Emerald Group Publishing, Limited (2010). (Year: 2010).*

*Primary Examiner* — Nicholas D Rosen
(74) *Attorney, Agent, or Firm* — Scully, Scott, Murphy & Presser, P.C.; Daniel Morris, Esq.

(57) ABSTRACT

A method, system and computer program product for adjusting prices for goods and services offered using a computer network. In one embodiment, data relating to goods and services offered over the computer network by a number of entities using the computer network are stored in a database, communications are monitored, using the computer network, to identify an interest of a user, and this interest of the user and the data in the database are used to identify one of the entities to offer a specified product or service to the user. Information is obtained relating to a price for the specified product or service, and this information and the data in the database are used to determine an adjusted price for the specified product or service. In one embodiment, the information the user has about a price for the specified product or service is used to determine the adjusted price.

17 Claims, 3 Drawing Sheets

(56) References Cited

U.S. PATENT DOCUMENTS

| | | | | |
|---|---|---|---|---|
| 7,099,833 | B1* | 8/2006 | Sundaresan | G06Q 20/201 705/20 |
| 7,376,613 | B1* | 5/2008 | Cofino | G06Q 20/10 705/26.3 |
| 7,454,367 | B2* | 11/2008 | Yu | G06Q 20/201 705/26.62 |
| 7,743,067 | B2* | 6/2010 | Ducheneaut | G06Q 30/02 707/769 |
| 8,082,349 | B1* | 12/2011 | Bhargava | G06Q 30/0185 709/203 |
| 9,659,317 | B2* | 5/2017 | Naghmouchi | G06Q 30/0283 |
| 9,785,984 | B2* | 10/2017 | Milstein | G06Q 20/02 |
| 10,290,030 | B1 | 5/2019 | Curtis et al. | |
| 2001/0049636 | A1* | 12/2001 | Hudda | G06O 30/06 705/26.1 |
| 2004/0015415 | A1* | 1/2004 | Cofino | G06Q 10/063 705/7.11 |
| 2004/0172372 | A1* | 9/2004 | Wells | G06Q 20/20 705/400 |
| 2004/0220884 | A1* | 11/2004 | Khan | G06Q 30/08 705/80 |
| 2004/0249643 | A1* | 12/2004 | Ouyang | G06Q 30/0283 705/400 |
| 2005/0160014 | A1* | 7/2005 | Moss | G06Q 30/00 705/26.61 |
| 2006/0085276 | A1* | 4/2006 | Hoech | G06Q 30/06 705/26.41 |
| 2006/0095787 | A1* | 5/2006 | Aaron | G06F 21/6263 713/184 |
| 2007/0214057 | A1* | 9/2007 | Lee | G06Q 30/0222 705/14.23 |
| 2007/0226064 | A1* | 9/2007 | Yu | G06Q 20/201 705/20 |
| 2008/0077487 | A1* | 3/2008 | Davis | G06Q 30/02 705/14.25 |
| 2008/0086384 | A1* | 4/2008 | Srinivasan | G06Q 10/10 705/26.1 |
| 2008/0208693 | A1* | 8/2008 | Milstein | G06Q 20/02 705/14.17 |
| 2009/0077057 | A1* | 3/2009 | Ducheneaut | G06Q 30/02 |
| 2010/0094727 | A1* | 4/2010 | Shapiro | G06Q 20/12 705/26.1 |
| 2010/0250444 | A1* | 9/2010 | Haun | G06Q 30/0601 705/80 |
| 2010/0280912 | A1* | 11/2010 | Gopalpur | G06Q 20/203 705/22 |
| 2015/0193797 | A1 | 7/2015 | Gerrity | |
| 2015/0317659 | A1 | 11/2015 | Nayak et al. | |

* cited by examiner

INDIVIDUAL ONLINE PRICE ADJUSTMENTS IN REAL TIME

CROSS-REFERENCE TO RELATED APPLICATION

This application is a continuation of copending U.S. patent application Ser. No. 13/034,180, filed Feb. 24, 2011, the entire contents and disclosure of which are hereby incorporated herein by reference.

BACKGROUND OF THE INVENTION

This invention generally relates to determining price adjustments for goods and services based on consumer related information. More specifically, embodiments of the invention relate to determining such price adjustments in real time during transactions using a computer network such as the Internet or any other computer network.

The purchase of goods and services over the Internet, or on-line, is becoming very common. Consumers now frequently use the Internet, for example, to buy travel related services such as airline tickets and hotel rooms, and entertainment related services such as tickets to concerts and sporting events. Many other products, from T-shirts to automobiles, are also purchased online, and the expectation is that the use of the Internet for shopping will grow substantially in the near future as more and more consumers get access to the Internet and become more familiar and comfortable with using the Internet.

In on-line sources (e.g. shopping forums, advertisements etc.), the prices for the goods and services may change frequently. This may be due to a number of factors such as current demand for a product, or any kind of price differentiation caused by the producer of a certain good. Prices may also change from day-to-day or from week-to-week as consumer interest changes. In some cases, the process for goods and services may be adjusted in real time—that is, while the consumer is shopping for the goods and services. Presently, two systems, on-line bargaining and an automated price management system, are used to adjust prices in real time in on-line retailing/shopping. An on-line bargaining system is described in Korean patent application no. 200000002175, and an automated price management system is described in U.S. patent application publication no. 2004/0172372.

The online bargaining system has the problem that it confronts both parties with non-negligible transaction costs (costs in a generic sense, not only from the monetary point of view, but also opportunity costs like time etc.); the potential customer's search costs might be lower than the costs for bargaining (so he might prefer searching for another seller rather than bargaining with the known seller). Also, in an on-line bargaining system, the action must be initiated by both parties, the potential seller and the potential customer as well. In this system, the potential seller has no method to verify if one of his potential customers is just a free rider or not; the price adjustment is not based on the potential customer's actual willingness to pay.

An automated price management system is mainly based on a competitor analysis. Such an analysis only allows making price adjustments for certain groups of potential customers, but not for individuals. It does not allow perfect price differentiation. Also, it does not cover the total market, and thus, there are opportunities for some other competitors to undercut prices. Also, this system is just based on content analysis of e.g., retail site sales (or something similar) and assumes that such content is not manipulated while it is transferred through the network. As well, such a system does not allow to circumvent bot protection mechanisms like human interfaces (e.g. embodied through curly numbers etc.). Such bot protection mechanisms are used to prevent automated price management systems from doing a competitor analysis based on web crawling techniques. Many e-commerce applications come with mechanisms that require a human to recognize how to use a key (e.g. curly numbers) to move to the next step in the application (e.g. it is hard for an automated system to detect curly numbers integrated into pictures or video, for the a human it is easy though).

BRIEF SUMMARY

Embodiments of the invention provide a method, system and computer program product for adjusting prices for goods and services offered using a computer network. In one embodiment, the method comprises storing in a database data relating to goods and services offered for sale by a number of entities using the computer network, monitoring communications, using the computer network, to identify an interest of a user, and using said interest of the user and the data in the database to identify one of said entities to offer a specified product or service to the user. This embodiment further comprises obtaining information relating to a price for the specified product or service, using said information and the data in the database to determine an adjusted price for the specified product or service, and offering the specified product or service to the user, at said adjusted price, from the identified one of said entities.

In one embodiment the goods and services may be offered for sale, and in an embodiment the goods and services may be offered for lease. In an embodiment the goods and services may be made available as part of other types of transactions.

In one embodiment, the information obtained relating to a price for the specified product or service includes information the user has about a price for the specified product or service, and this information the user has is used to determine the adjusted price for the identified product or service. In one embodiment, information relating to a price for the specified product or service also includes information obtained from one or more sources such as one or more web sites.

In an embodiment, the database includes a set of rules for determining adjusted prices for goods and services offered to users, and the adjusted price for the specified product or service is determined using said set of rules.

In an embodiment, the database includes a respective one set of rules for each of the entities to determine adjusted prices for goods or services offered by said each of the entities.

In one embodiment, an identification of the user is sent to the identified one of said entities.

In an embodiment, the monitored communications are monitored Internet communications and are used to create a representation of the user's interest, and the database is searched, using said representation, for a match of the user's interest.

In one embodiment, the monitored communications include communications associated with multiple users; and the method and system distinguish among the monitored communications associated with each of the multiple users.

Embodiments of the invention create a price differentiation based on a system that can determine price adjustments mainly based on the information a potential consumer has. In an embodiment this is done in real-time, i.e., the potential consumer of a good receives the adjusted price on the spot without the involvement of a merchant, but based on well defined prior rules agreed upon by merchant and service provider. The way to create this price differentiation is to separately determine each individual's willingness to pay from maintaining overall traffic of the customers.

In an embodiment of the invention, the system operator has a number of agreements active with the distinct commercial entities (merchants) for the adjustments of their products' prices. The operator uses the invention to profile the user's current topic of interest, especially the class/model of products the user has intentionally been looking for (e.g., Google query, multiple visits of websites/applications with related/similar content, etc.), and a record is kept of the interests and/or the adjusted prices.

At any time, traffic that the user is consuming may be inspected. The invention, in embodiments, can manipulate/replace pre-existing prices of products offered by commercial parties (merchants) the operator has an agreement with. The invention, in embodiments, forwards an anonymous ID including the adjusted prices to the host system of the specific collaborating parties (e.g., retailer, etc.).

In embodiments, the invention uses a variable/adjustable rule set to determine the recommended price, and the invention allows the operator to track the success of individual price adjustments. The invention also can place individually manipulated prices into advertisements by insertion into the traffic consumed by the user.

Embodiments of the invention may be operated by an internet provider, or telecommunication company, or a content delivery network or a private company that manages its own internal corporate network. The invention allows who operates it to adjust, on the fly, prices shown in e-commerce applications, or in online advertisements that are present in the traffic directed to the individual user, based on legal contracts with parties whose contents might be manipulated. The invention allows individual price adjustments and the insertion of such manipulated prices into network traffic. At the same time, a tag (which can be, but is not limited to a non-anonymous or an anonymous user ID) is sent to the host of the corresponding e-commerce application/online advertisement together with the adjust price, so that e.g. the corresponding merchant's system can recognize which special price was assigned to an individual that has the intent to finally buy a certain good.

Embodiments of the invention allow creating individual price adjustments based on a rule set which can be modified. The invention allows rule set verification and quality analysis of the rule set for the operator, who can also consult collaborating companies regarding improvements on the used rule set. The invention allows a strategical market analysis based on the statistical data analysis of all profiled individuals, and the invention allows detecting/determining new substitutes (i.e., products that might be able to substitute the use of a given product).

Embodiments of the invention perform the manipulations in an intelligent way that takes into account: 1) the deep contents of any traffic, and 2) a data base of agreements between the operator and other commercial entities.

These techniques allow price differentiation of $1^{st}$ grade (referred to as perfect price differentiation) for commercial entities (merchants) over a special interface just by determining the price a user is willing to pay based on the information the user owns.

In embodiments of the invention, the price differentiation is determined neither through a bilateral bargaining system nor through analyzing current competitor prices, retail site sales, or other price related factors. The fact that matters is the user's private information about prices for a specific good. Since a potential customer faces search costs, he never has perfect information about the market prices of certain goods. In most cases, it is too expensive for an individual to determine the "true" lowest price of a certain good in which a merchant is still willing to sell. This invention can be used for offering a price to the individual customer slightly below the price he already knows about. To collect the individual user's information, his network traffic can be scanned and the important content can be filtered out.

DETAILED DESCRIPTION

Figure 1:
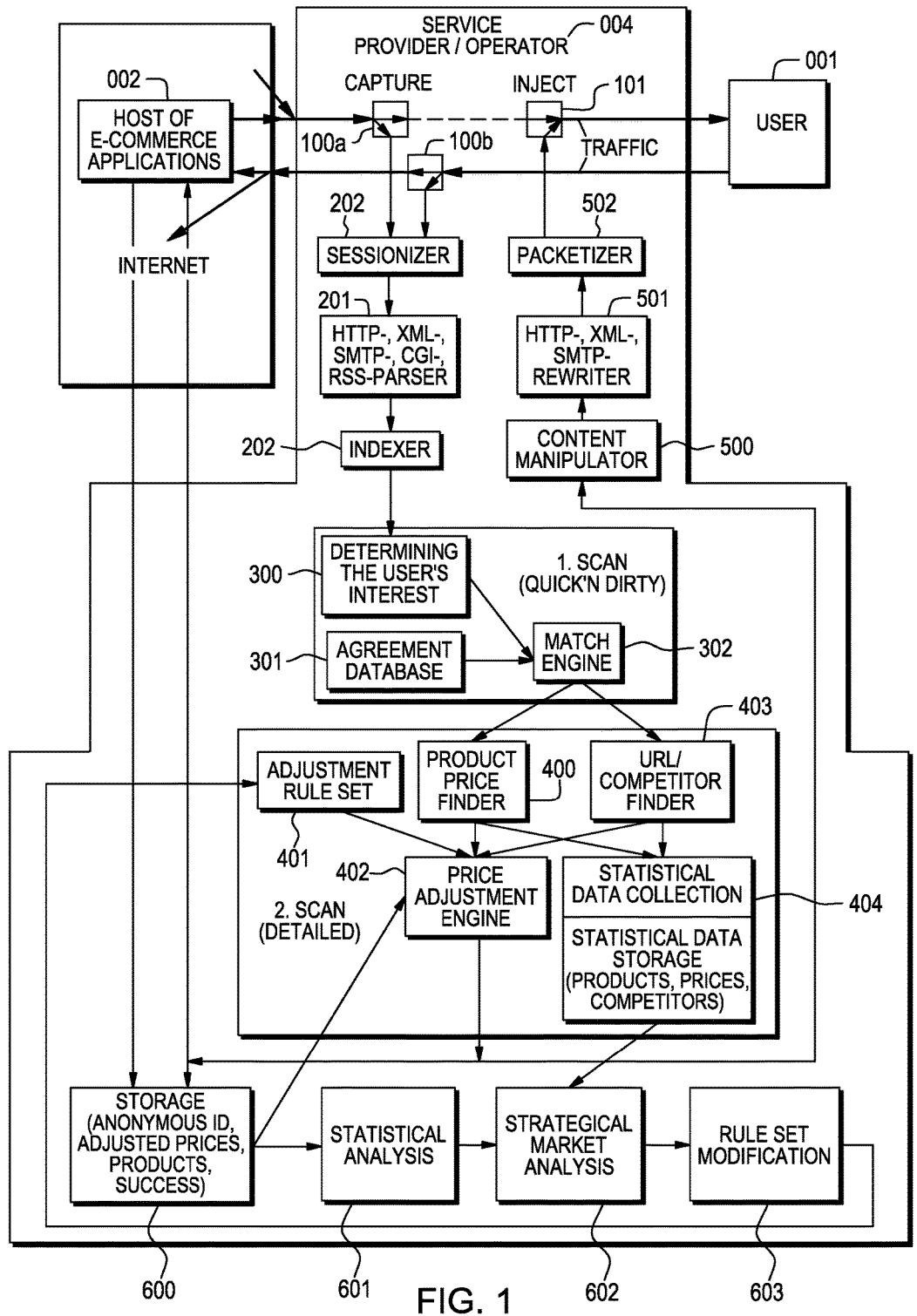
FIG. 1 illustrates an embodiment of the invention.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments of the invention enable real time, on-line price adjustments for goods and services based on consumer related information. FIG. 1 is a diagram illustrating an embodiment of the invention.

The goods and services may be offered in or as part of a variety of different types of transactions. In one embodiment the goods and services may be offered for sale, and in an embodiment the goods and services may be offered for lease or rent or other type of temporary use. In an embodiment the goods and services may be made available as part of other types of transactions.

With reference to FIG. 1, an embodiment of the invention captures (100a, 100b) all the traffic coming from the internet in general and/or from a specific host for e-commerce applications (002) to the users (001) as well as from the users (001) to the internet. This embodiment of the invention is designed to distinguish traffic associated with each of the distinct users (001) using a sessionizer (200) and to maintain an individual representation for each of the users. The invention, in this embodiment, uses a parser (201) to filter valid tokens out of the network traffic, before an indexer (202) hashes the tokens, sorts their hash values, and stores the sorted hash values temporarily. Using these data, the invention, in this embodiment, creates a representation of the user's interest (300). According to the agreement database or knowledge base (301) the operator/service provider (004) has with merchants, a match engine (302) tries to find matches with the users interests (300). In the next step, a product price finder (400) determines the information the user (001) has about prices for a certain product he was searching for, and the result is forwarded to a price adjustment engine (402).

Figure 2:
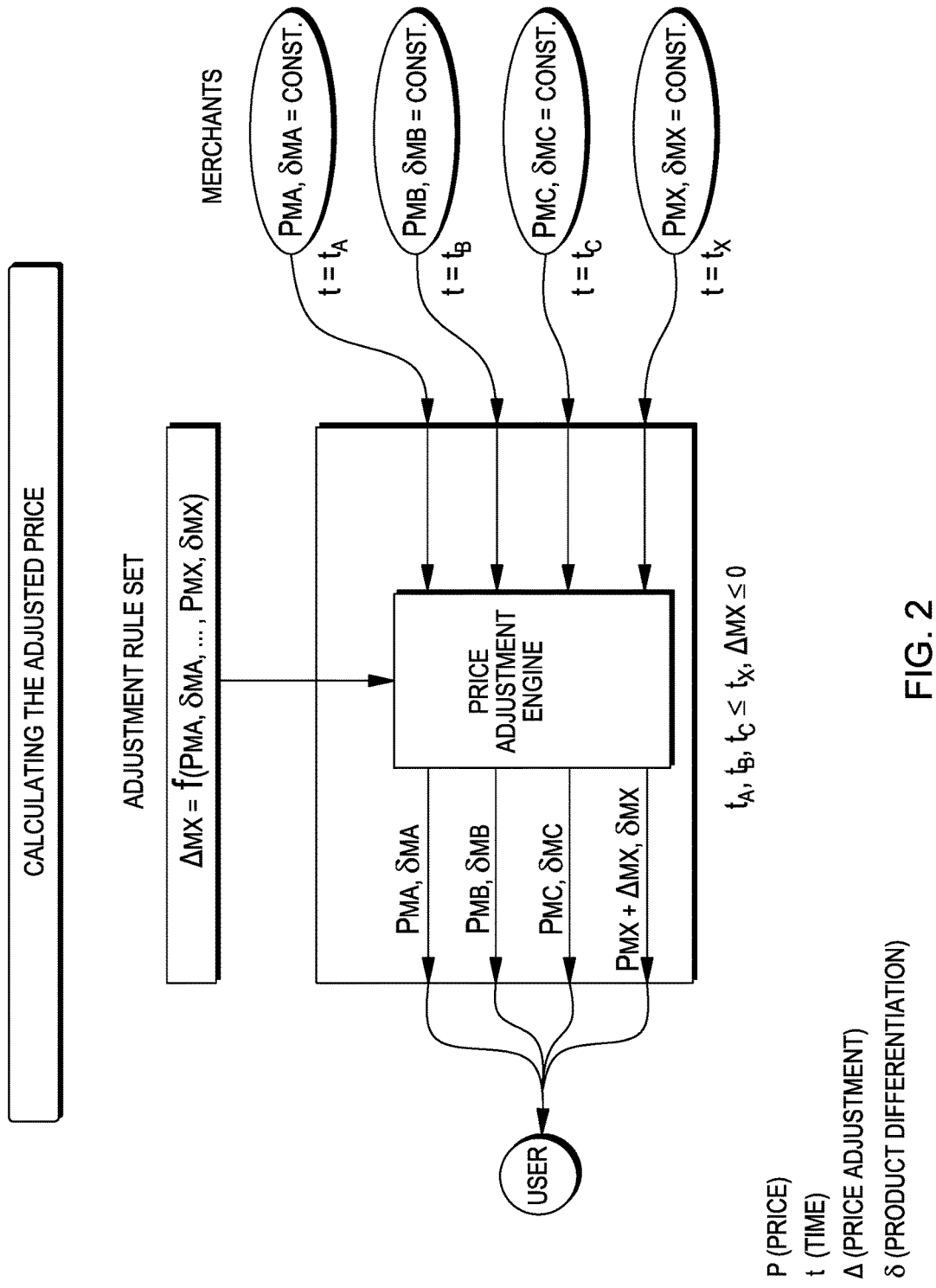
FIG. 2 shows in more detail the Price Adjustment Engine and the Adjustment Rule Set of the embodiment of FIG. 1

With reference to FIGS. 1 and 2, the adjustment engine (402) calculates the price adjustment for the specific product according to a specific adjustment rule set (401) agreed upon by the certain merchant and the service provider (004). The Adjustment Rule Set is mainly a function that respects dependencies of the adjustment regarding price and product differentiation (secondary product features like service, quality, etc.) of all products of the same category.

The price adjustment engine also checks, if the user (001) was offered an adjusted price before for the certain product, using stored data (600). Optionally the price adjustment engine can make use of data obtained through the URL/competitor finder (403). This price adjustment is forward to a content manipulator (500) that feeds a rewriter (501) so that the traffic which is directed to the user can be legally manipulated in real-time, i.e., the invention follows the requirements for the quality of service (e.g., within milliseconds, the traffic is modified). After rewriting the content, a packetizer (502) creates the corresponding package that is injected (101) into the user's traffic.

The adjustment as well as a tag (e.g. an anonymous user ID) are forwarded to the host of the specific merchant's e-commerce applications (002). Also the adjustment, the tag, and an optional expiration date for the recommended adjustment area stored in the operator's database (600), so that at the next logon of the user, these data can be reused and do not need to be recalculated. The storage (600) is not used for storing all or parts of the user's traffic.

In the case of a successful purchase/sale, the merchant's host system (002) sends information about the purchase/sale to the operator of the invention that stores the information in the database (600). Data from the Storage (600) is used for the purpose of a statistical analysis (601). In addition, the invention, in this embodiment, filters URLs and/or competitor names out of the traffic of the user (001) using a URL/competitor finder (403); and data about competitors, prices and products, which were determined by the price product finder (400), can be used for a statistical data collection (404) and stored in a separate storage, referred to as statistical data storage (404).

Data stored in this storage is statistical data and can not be connected with any user. These data later can be used for the strategical market analysis (602). A rule set modification (603) of the current adjustment rule set (401) can be done based on a strategical market analysis (602) that is derived from statistical data created by the statistical analysis (601) and from the stored competitor price data (404).

The invention, in this embodiment, does not store any part of the user's traffic that can be connected with the certain user nor does this embodiment of the invention forward all or parts of the user's traffic or private information to any third party. As well, the invention, in this embodiment, does not publish all or parts of the user's traffic or private information. Content manipulation follows rules agreed upon in legal contracts by the operator (004) and certain commercial entities (merchants) (002).

As will be understood by those of ordinary skill in the art, embodiments of the invention allow dealing with multiple users (001) as well as with multiple merchants (002) and multiple products. The example of FIG. 1 shows only single individuals for purposes of simplification.

As mentioned above, in embodiments of the invention, the price differentiation is not obtained either through a bilateral bargaining system or through analyzing current competitor's prices. Embodiments of the invention do not primarily make general price adjustments valid for any user, and do not make price adjustments primarily based on the analysis of current competitor prices, retail site sales or other price related factors. Embodiments of the invention do allow individual price adjustments based on recommendations by the operator who knows about the individual user's sources of information/traffic contents, and allow a detailed strategical market analysis using collected statistical data.

Figure 3:
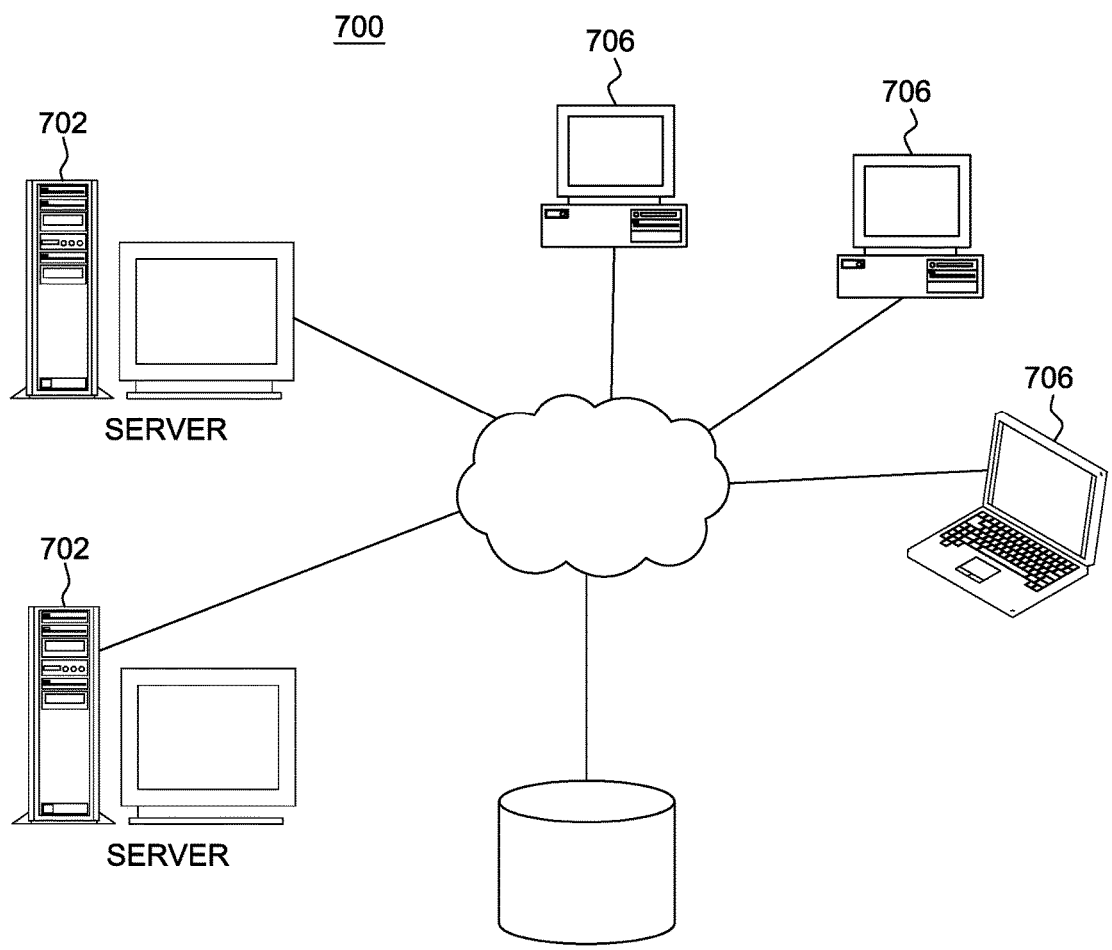
FIG. 3 shows a computing environment in which embodiments of the invention may be implemented.

FIG. 3 depicts a pictorial representation of a network 700 in which the present invention may be practiced. Network 700 is representative of the Internet, which is based on the client-server model. Conceptually, the Internet includes a large network of servers 702 that are accessible by clients 704, typically users of personal computers, through some private Internet-access provider or an on-line service provider. A network storage device 706 may also be included. Each of the clients 704 may run a "browser," which is a known software tool used to access servers 702 via the access providers. Each server operates a Web site, which supports files in the form of documents and pages. A network path to each server is identified by a Universal Resource Locator having a known syntax for defining a network collection.

Each server 702 may be a symmetric multiprocessor (SMP) system including a plurality of processors connected to a system bus. Alternatively, a single processor system may be employed.

In addition, the servers can have other buses, an I/O interface, input or output devices (such as keyboard and display), memories, caches, a communication system, and server software, which are not shown in FIG. 3. The servers 702 provide data to the clients and may also provide other files such as boot files, operating system images, and applications. The storage device 706 can have data stored in distributed storage such as a LAN, a WAN, or a storage area network (SAN).

Each client 704 includes a processing unit, which houses a processor, memory and other systems components (not shown expressly in the drawing) that implement a general purpose processing system or computer that may execute a computer program product. The computer program product may comprise media, for example a compact storage medium such as a compact disc, which may be read by the processing unit through a disc drive, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within a processing unit, as mentioned, or may be located on a remote system such as one of the servers 102. Each client 704 may include a monitor, keyboard, and mouse or other input device coupled to the processing unit of the client to provide user interaction. Each client may be connected to one or more peripheral devices such as a printer and a scanner. These peripheral devices may be connected to the processing unit of the client via a network connection, or may be coupled directly to the processing unit.

As will be understood by those of ordinary skill in the art, network 700 may include additional servers, clients, and other devices not shown. Also, the invention may be implemented using other types of computer networks such as an intranet, or a telephone network in which computer or computer systems are used to process or monitor telecommunications data. FIG. 3 is intended as an example, and not as an architectural limitation for the present invention.

While it is apparent that the invention herein disclosed is well calculated to fulfill the objectives discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of a third party system operator offering goods and services from merchants to potential customers at prices determined by said third party system operator based on information the potential customers have, the method comprising:

the system operator storing, by using a computer system, in a database data relating to goods and services offered over a computer network by a number of merchants;

the system operator monitoring, by using a sessionizer and a parser of the computer system, communications of a user over the computer network, and using the computer system and data from the monitored communications to create a representation of an interest of the user, including:

filtering by the parser valid tokens out of the communications of the user over the computer network, hashing by an indexer the filtered tokens to obtain hashed values, sorting by the indexer the hashed values, storing by the indexer the sorted hashed values, and using, by the computer system, the stored, sorted, hashed values to create the representation of the interest of the user, the system operator using a match engine of the computer system to match said interest of the user with one of said merchants;

the system operator, by a product price finder operating on the computer system, determining information the user has about prices for a specified product or service;

the system operator, by an adjustment engine of the computer system, using said determined information the user has about prices for the specified product or service, and in accordance with a specified rule set, to determine a price to offer the specified product or service of said one merchant to the user;

the system operator, by the computer system, offering the specified product or service to the user over the computer network at said price determined by the system operator;

the system operator sending specified data over the computer network to the one merchant, the specified data including a tag identifying the user and the price at which the specified product or service is offered to the user;

said one of the merchants sending to the system operator purchase information about a purchase of the specified product or service;

the system operator storing the purchase information in the database and using the purchase information for a statistical analysis; and using the information determined by the product price finder for a statistical data collection.

2. The method according to claim 1, further comprising storing the information determined by the product price finder in a statistical data storage.

3. The method according to claim 1, further comprising using the information determined by the product price finder for a strategical market analysis.

4. The method according to claim 3, further comprising modifying the specified rule set based on the strategical market analysis.

5. The method according to claim 1, wherein the system operator monitoring communications of a user includes filtering out of the communications of the user names of competitors of the one of the merchants.

6. The method according to claim 5, wherein the filtering out of the communications of the user names of competitors of the one of the merchants includes using a URL/competitor finder to filter out the names of the competitors.

7. The method according to claim 1, wherein the determining information that the user has about prices for the specified product or service includes obtaining said information from Internet communications.

8. The method according to claim 7, wherein the determining information that the user has about prices for the specified product or service includes obtaining additional information about said price over the Internet from one or more sources.

9. The method according to claim 1, wherein the database includes a respective one set of rules for each of the merchants to determine adjusted prices for goods or services offered by said each of the merchants.

10. A system for a third party system operator to offer goods and services from merchants to potential customers at prices determined by said third party system operator based on information the potential customers have, comprising one or more processing units configured for:

storing, by the system operator, in a database data relating to goods and services offered over a computer network by a number of merchants;

monitoring, by the system operator, by using a sessionizer and a parser of a computer system, communications of a user over the computer network, and using the computer system and data from the monitored communications to create a representation of an interest of the user, including:

filtering by the parser valid tokens out of the communications of the user over the computer network, hashing by an indexer the filtered tokens to obtain hashed values, sorting by the indexer the hashed values, storing by the indexer the sorted hashed values, and using, by the computer system, the stored, sorted, hashed values to create the representation of the interest of the user, using, by the system operator, a match engine of the computer system to match said interest of the user with one of said merchants;

functioning as a product price finder operating for determining, by the system operator, information the user has about prices for the a specified product or service;

functioning as a price adjustment engine for using, by the system operator, said determined information the user has about prices for the specified product or service, and in accordance with a specified rule set, to determine a price to offer the specified product or service of said one merchant to the user;

offering, by the system operator, the specified product or service to the user over the computer network at said price determined by the system operator;

sending, by the system operator, specified data over the computer network to the one merchant, the specified data including a tag identifying the user and the price at which the specified product or service is offered to the user;

receiving from said one of the merchants purchase information about a purchase of the specified product or service; and using, by the system operator, the information determined by the product price finder for a statistical data collection;

storing, by the system operator, the purchase information in the database and using the purchase information for a statistical analysis.

11. The system according to claim 10, further comprising storing, by the system operator, the information determined by the product price finder in a statistical data storage.

12. The system according to claim 10, further comprising using, by the system operator, the information determined by the product price finder for a strategical market analysis.

13. The system according to claim 12, further comprising modifying, by the system operator, the specified rule set based on the strategical market analysis.

14. An article of manufacture comprising:

one or more tangible program storage hardware devices tangibly embodying a program of instructions executable by one or more processing units to perform method steps for a third party system operator to offer goods and services from merchants to potential customers at prices determined by said third party system operator and based on information the potential customers have, said method steps comprising:

storing, by the system operator, in a database data relating to goods and services offered over a computer network by a number of merchants;

monitoring, by the system operator, by using a sessionizer and a parser of a computer system, communications of a user over the computer network, and using the computer system and data from the monitored communications to create a representation of an interest of the user, including:

filtering by the parser valid tokens out of the communications of the user over the computer network, hashing by an indexer the filtered tokens to obtain hashed values, sorting by the indexer the hashed values, storing by the indexer the sorted hashed values, and using, by the computer system, the stored, sorted, hashed values to create the representation of the interest of the user, using, by the system operator, a match engine of the computer system to match said interest of the user with one of said merchants;

functioning as a product price finder operating for determining, by the system operator, information the user has about prices for a specified product or service;

functioning as a price adjustment engine for using, by the system operator, said determined information the user has about prices for the specified product or service, and in accordance with a specified rule set, to determine a price to offer the specified product or service of said one merchant to the user;

offering, by the system operator, the specified product or service to the user over the computer network at said price determined by the system operator;

sending, by the system operator, specified data over the computer network to the one merchant, the specified data including a tag identifying the user and the price at which the specified product or service is offered to the user;

receiving from said one of the merchants purchase information about a purchase of the specified product or service;

storing, by the system operator, the purchase information in the database and using the purchase information for a statistical analysis; and using, by the system operator, the information determined by the product price finder for a statistical data collection.

15. The article of manufacture according to claim 14, wherein said method steps further comprise storing, by the system operator, the information determined by the product price finder in a statistical data storage.

16. The article of manufacture according to claim 14, wherein said method steps further comprise using, by the system operator, the information determined by the product price finder for a strategical market analysis.

17. The system according to claim 16, wherein said method steps further comprise modifying, by the system operator, the specified rule set based on the strategical market analysis.

* * * * *